United States Patent
Yu et al.

(10) Patent No.: US 12,532,197 B2
(45) Date of Patent: Jan. 20, 2026

(54) CHANNEL STATE INFORMATION MEASUREMENT METHOD AND APPARATUS

(71) Applicant: HUAWEI TECHNOLOGIES CO., LTD., Shenzhen (CN)

(72) Inventors: Jian Yu, Beijing (CN); Jiafeng Shao, Beijing (CN); Yang Ding, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 567 days.

(21) Appl. No.: 17/895,127

(22) Filed: Aug. 25, 2022

(65) Prior Publication Data

US 2022/0408288 A1    Dec. 22, 2022

Related U.S. Application Data

(63) Continuation of application No. PCT/CN2020/077221, filed on Feb. 28, 2020.

(51) Int. Cl.
*H04W 24/08* (2009.01)
*H04B 7/06* (2006.01)

(52) U.S. Cl.
CPC .......... *H04W 24/08* (2013.01); *H04B 7/0626* (2013.01)

(58) Field of Classification Search
CPC .... H04W 24/08; H04B 7/0626; H04L 5/0062; H04L 5/0055; H04L 5/0094; H04L 5/0057; Y02D 30/70
See application file for complete search history.

(56) References Cited

U.S. PATENT DOCUMENTS

2018/0175925 A1* 6/2018 Liu ...................... H04B 7/0626
2018/0269939 A1 9/2018 Hu et al.
(Continued)

FOREIGN PATENT DOCUMENTS

CN 103188796 A 7/2013
EP 2899909 A1 * 7/2015 ............ H04W 72/23

OTHER PUBLICATIONS

European Office Action issued in corresponding European Application No. 20921883.3, dated Dec. 6, 2023, pp. 1-7.
(Continued)

*Primary Examiner* — Jason E Mattis
*Assistant Examiner* — Robert Ma
(74) *Attorney, Agent, or Firm* — HAUPTMAN HAM, LLP

(57) ABSTRACT

A channel state information measurement method includes receiving, by a terminal device, configuration information from a network device. The configuration information includes first indication information and second indication information. The first indication information indicates K channel measurement signal resources, K is greater than or equal to 2, the second indication information indicates the terminal device is to measure aggregated channel state information (CSI) based on N channel measurement signal resources, and N is less than or equal to K. The method also includes measuring, by the terminal device, the N channel measurement signal resources based on the configuration information. The method further includes obtaining, by the terminal device, the aggregated CSI through calculation based on N measurement results. The aggregated CSI is CSI of M antenna ports, and M is a sum of quantities of antenna ports of the N channel measurement signal resources.

20 Claims, 7 Drawing Sheets

(56) References Cited

U.S. PATENT DOCUMENTS

2019/0199492 A1* 6/2019 Na .................. H04W 4/00
2019/0335474 A1* 10/2019 Tang ................ H04L 5/00
2020/0112355 A1* 4/2020 Park ............. H04B 7/0626

OTHER PUBLICATIONS

Huawei et al:"Supporting CDMS for {24,32} ports CSI-RS",3GPP Draft; R1-1703060,Feb. 12, 2017,XP051210198, total 7 pages.

Nokia et al: "Nonprecoded CSI-RS for Class A CSI Reporting", 3GPP Draft; R1-166339,Aug. 21, 2016, XP051140169, total 8 pages.

Extended European Search Report issued in corresponding European Application No. 20921883.3, dated Nov. 18, 2022, pp. 1-9.

Fujitsu, Aggregated CSI-RS Configuration and Signaling. 3GPP TSG RAN WG1 Meeting #87, Reno, USA Nov. 14-18, 2016, R1-1611463, 4 pages.

3GPP TS 38.331 V15.8.0 (Dec. 2019), 3rd Generation Partnership Project; Technical Specification Group Radio Access Network; NR; Radio Resource Control (RRC) protocol specification(Release 15), 532 pages.

LG Electronics, Consideration on Aggregated Feedback. 3GPP TSG RAN WG1 Meeting #68 , Dresden, Germany, Feb. 6-10, 2012, R1-120433, 2 pages.

3GPP TS 38.212 V16.0.0 (Dec. 2019), 3rd Generation Partnership Project; Technical Specification Group Radio Access Network; NR; Multiplexing and channel coding(Release 16), 145 pages.

International Search Report issued in corresponding International Application No. PCT/CN2020/077221, dated Dec. 1, 2020, pp. 1-8.

* cited by examiner

CHANNEL STATE INFORMATION MEASUREMENT METHOD AND APPARATUS

CROSS-REFERENCE TO RELATED APPLICATIONS

This application is a continuation of International Application No. PCT/CN2020/077221, filed on Feb. 28, 2020, the disclosure of which is hereby incorporated by reference in its entirety.

TECHNICAL FIELD

This application relates to the field of communication technologies, and in particular, to a channel state information (CSI) measurement method and an apparatus.

BACKGROUND

In a wireless communication system, a base station allocates a time-frequency resource to a terminal device based on CSI. The CSI is measured by the terminal device, based on a reference signal sent by the base station, and fed back to the base station. The CSI includes a rank indicator (RI), a precoding indicator (PMI), a channel quality indicator (CQI), and the like. In a CSI measurement process, the terminal device may measure channel quality at a current moment based on a channel state information reference signal (CSI-RS) sent by the base station, and then feed back the channel quality to the base station.

In CSI measurement, CSI measurement for a plurality of antenna ports is usually supported. To measure a channel on each antenna port of the base station, a quantity of CSI-RS ports is usually configured to be the same as a quantity of antenna ports. A larger quantity of CSI-RS ports indicates a larger quantity of radio frequency channels of the base station and a stronger capability of parallel multi-stream data transmission. In a large-scale array antenna technology, a quantity of radio frequency channels may reach 32, 64, or more.

However, when a large quantity of ports are configured in CSI measurement, although a system capacity can be effectively improved, power consumption of a base station is large, and operation costs are high.

SUMMARY

This application provides a channel state information measurement method and an apparatus, to make it possible to reduce power consumption of a network device.

A first aspect of embodiments of this application provides a channel state information measurement method, including:

A terminal device receives configuration information from a network device, where the configuration information includes first indication information and second indication information, the first indication information indicates K channel measurement signal resources, K is greater than or equal to 2, the second indication information indicates the terminal device is to measure aggregated CSI based on N channel measurement signal resources, and N is less than or equal to K; and the terminal device measures the N channel measurement signal resources based on the configuration information, and obtains the aggregated CSI through calculation based on N measurement results, where the aggregated CSI is CSI of M antenna ports, and M is a sum of quantities of antenna ports of the N channel measurement signal resources. Aggregated measurement is performed on a plurality of channel measurement signal resources, so that a quantity of time domain symbols occupied by a channel measurement signal resource during CSI measurement can be reduced. This helps a network device reduce energy consumption on a network side by using a time domain symbol power saving function, and makes it possible to reduce power consumption of the network device.

In a possible design, N is less than K, and the second indication information includes one or more indexes of the N channel measurement signal resources in the K channel measurement signal resources and indication information indicating aggregated CSI measurement. In this way, the N channel measurement signal resources may be obtained based on the indexes of the N channel measurement signal resources, and used for the aggregated CSI measurement.

In a possible design, N is equal to K, the second indication information is information for enabling feedback for the aggregated CSI, and the method further includes: The terminal device sends the aggregated CSI to the network device based on the second indication information. In this way, the network device may perform resource scheduling and the like based on the aggregated CSI fed back by the terminal device.

In a possible design, that the terminal device obtains the aggregated CSI through calculation based on N measurement results includes: The terminal device calculates the aggregated CSI by using the following information: channels corresponding to N multi-antenna-port resources, a weight coefficient on a receive antenna of the terminal device, a precoder obtained by the terminal device through measurement, an interference covariance matrix, and a noise variance.

In a possible design, the configuration information further includes third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI. In this way, a time domain symbol in each time unit may be fully used, so that a quantity of time domain symbols may be reduced. This makes it possible to reduce energy consumption of a base station.

In a possible design, the third indication information includes a time unit offset parameter.

In a possible design, the third indication information includes one or more time units, and a time unit offset parameter corresponding to each time unit.

In a possible design, the third indication information includes indication information indicating periodic measurement.

In a possible design, the terminal device receives fourth indication information from the network device, where the fourth indication information is used to activate or deactivate aggregated measurement.

In a possible design, the terminal device receives fifth indication information from the network device, where the fifth indication information is used to activate or deactivate N1 channel measurement signal resources for aggregated measurement, and N1 is less than or equal to N. In this way, a dynamic change of an antenna port may be adapted, so that repeatedly configuring channel measurement signal resources of different antenna ports and corresponding measurement and feedback information for a plurality of times is avoided, and a configuration resource is saved.

In a possible design, the terminal device sends CSI corresponding to one or more of the N channel measurement signal resources to the network device. This may be used as a reference for subsequent resource scheduling by the network device, to implement more flexible resource scheduling.

A second aspect of embodiments of this application provides a channel state information measurement method, including:

A network device generates configuration information, where the configuration information includes first indication information and second indication information, the first indication information indicates K channel measurement signal resources, K is greater than or equal to 2, the second indication information indicates a terminal device is to measure aggregated CSI based on N channel measurement signal resources, and N is less than or equal to K; and the network device sends the configuration information to the terminal device.

In a possible design, N is less than K, and the second indication information includes one or more indexes of the N channel measurement signal resources in the K channel measurement signal resources and indication information indicating aggregated CSI measurement.

In a possible design, N is less than K, the second indication information is information for enabling feedback for the aggregated CSI, and the method further includes: The network device receives the aggregated CSI from the terminal device, where the aggregated CSI is CSI of M antenna ports, and M is a sum of quantities of antenna ports of the N channel measurement signal resources.

In a possible design, the configuration information further includes third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI.

In a possible design, the third indication information includes a time unit offset parameter.

In a possible design, the third indication information includes one or more time units, and a time unit offset parameter corresponding to each time unit.

In a possible design, the third indication information includes indication information indicating to perform aggregated measurement on channel measurement signal resources in a plurality of periods.

In a possible design, the method further includes: The network device disables a radio frequency channel that does not send an orthogonal frequency division multiplexing OFDM symbol.

In a possible design, the network device sends fourth indication information to the terminal device, where the fourth indication information is used to activate or deactivate aggregated measurement.

In a possible design, the network device sends fifth indication information to the terminal device, where the fifth indication information is used to activate or deactivate N1 channel measurement signal resources for aggregated measurement, and N1 is less than or equal to N.

In a possible design, the network device receives CSI corresponding to one or more multi-channel measurement signal resources in the N channel measurement signal resources.

A third aspect of embodiments of this application provides a channel state information measurement apparatus, used in a terminal device, and including: a receiving module, configured to receive configuration information from a network device, where the configuration information includes first indication information and second indication information, the first indication information indicates K channel measurement signal resources, K is greater than or equal to 2, the second indication information indicates the terminal device is to measure aggregated CSI based on N channel measurement signal resources, and N is less than or equal to K; and a processing module, configured to measure the N channel measurement signal resources based on the configuration information, and obtain the aggregated CSI through calculation based on N measurement results, where the aggregated CSI is CSI of M antenna ports, and M is a sum of quantities of antenna ports of the N channel measurement signal resources.

In a possible design, N is less than K, and the second indication information includes one or more indexes of the N channel measurement signal resources in the K channel measurement signal resources and indication information indicating aggregated CSI measurement.

In a possible design, N is less than K, the second indication information is information for enabling feedback for the aggregated CSI, and the apparatus further includes a sending module, configured to send the aggregated CSI to the network device based on the second indication information.

In a possible design, the processing module is configured to calculate the aggregated CSI by using the following information: channels corresponding to N multi-antenna-port resources, a weight coefficient on a receive antenna of the terminal device, a precoder obtained by the terminal device through measurement, an interference covariance matrix, and a noise variance.

In a possible design, the configuration information further includes third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI.

In a possible design, the third indication information includes a time unit offset parameter.

In a possible design, the third indication information includes one or more time units, and a time unit offset parameter corresponding to each time unit.

In a possible design, the third indication information includes indication information indicating periodic measurement.

In a possible design, the receiving module is further configured to receive fourth indication information from the network device, where the fourth indication information is used to activate or deactivate aggregated measurement.

In a possible design, the receiving module is configured to receive fifth indication information from the network device, where the fifth indication information is used to activate or deactivate N1 channel measurement signal resources for aggregated measurement, and N1 is less than or equal to N.

In a possible design, the sending module is further configured to send CSI corresponding to one or more of the N channel measurement signal resources to the network device.

A fourth aspect of embodiments of this application provides a channel state information measurement apparatus, used in a network device, and including: a processing module, configured to generate configuration information, where the configuration information includes first indication information and second indication information, the first indication information indicates K channel measurement signal resources, K is greater than or equal to 2, the second indication information indicates a terminal device is to measure aggregated CSI based on N channel measurement signal resources, and N is less than or equal to K; and a sending module, configured to send the configuration information to the terminal device.

In a possible design, N is less than K, and the second indication information includes one or more indexes of the N channel measurement signal resources in the K channel measurement signal resources and indication information indicating aggregated CSI measurement.

In a possible design, N is less than K, the second indication information is information for enabling feedback for the aggregated CSI, and the apparatus further includes a receiving module, configured to receive the aggregated CSI from the terminal device, where the aggregated CSI is CSI of M antenna ports, and M is a sum of quantities of antenna ports of the N channel measurement signal resources.

In a possible design, the configuration information further includes third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI.

In a possible design, the third indication information includes a time unit offset parameter.

In a possible design, the third indication information includes one or more time units, and a time unit offset parameter corresponding to each time unit.

In a possible design, the third indication information includes indication information indicating to perform aggregated measurement on channel measurement signal resources in a plurality of periods.

In a possible design, the apparatus further includes: The network device disables a radio frequency channel that does not send an orthogonal frequency division multiplexing OFDM symbol.

In a possible design, the sending module is further configured to send fourth indication information to the terminal device, where the fourth indication information is used to activate or deactivate aggregated measurement.

In a possible design, the sending module is further configured to send fifth indication information to the terminal device, where the fifth indication information is used to activate or deactivate N1 channel measurement signal resources for aggregated measurement, and N1 is less than or equal to N.

In a possible design, the receiving module is configured to receive CSI corresponding to one or more multi-channel measurement signal resources in the N channel measurement signal resources.

A fifth aspect of embodiments of this application provides a communication apparatus. The communication apparatus may be a chip or a system-on-a-chip in a terminal device, and includes a processor and an interface circuit. The interface circuit is configured to receive code instructions and transmit the code instructions to the processor. The processor is configured to run the code instructions, to perform the method according to any one of the first aspect or the possible designs of the first aspect.

A sixth aspect of embodiments of this application provides a communication apparatus. The communication apparatus may be a chip or a system-on-a-chip in a terminal device, and includes a processor and an interface circuit. The interface circuit is configured to receive code instructions and transmit the code instructions to the processor. The processor is configured to run the code instructions, to perform the method according to any one of the second aspect or the possible designs of the second aspect.

A seventh aspect of embodiments of this application provides a computer-readable storage medium. The computer-readable storage medium is configured to store a computer program, and the computer program is used to implement the method according to any one of the first aspect or the possible designs of the first aspect.

An eighth aspect of embodiments of this application provides a computer-readable storage medium. The computer-readable storage medium is configured to store a computer program, and the computer program is used to implement the method according to any one of the second aspect or the possible designs of the second aspect.

A ninth aspect of embodiments of this application provides a communication system. The communication system includes the apparatus according to the third aspect and corresponding feasible implementations and the apparatus according to the fourth aspect and corresponding feasible implementations.

It should be understood that technical solutions in the second aspect to the ninth aspect of embodiments of this application correspond to technical solutions in the first aspect of embodiments of this application, and beneficial effects achieved by the aspects and the corresponding feasible implementations are similar. Details are not described again.

DESCRIPTION OF EMBODIMENTS

A method in embodiments of this application may be applied to long term evolution (LTE), a 5th generation (5G) mobile communication system, or a future mobile communication system.

Figure 1:
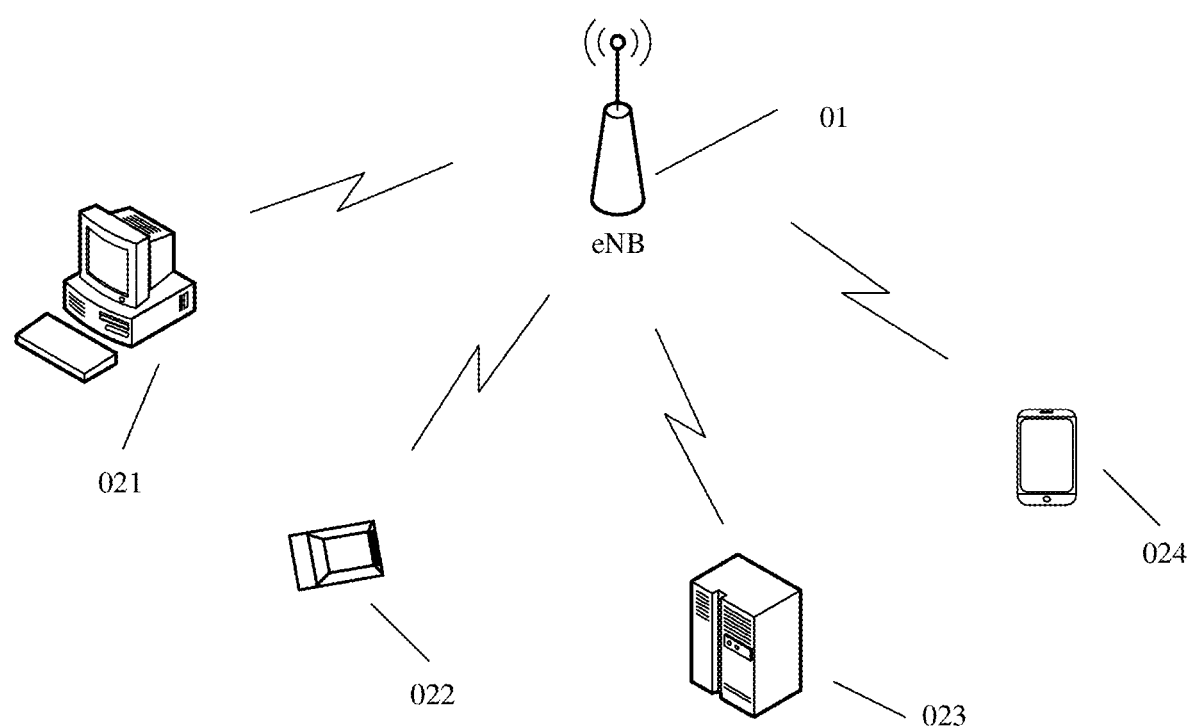
FIG. 1 is a schematic diagram of an application scenario of a channel state information measurement method according to an embodiment of this application.

FIG. 1 is a schematic diagram of a structure of a communication system according to an embodiment of this application. As shown in FIG. 1, the communication system may include a network device 01, a terminal device 021, a terminal device 022, a terminal device 023, and a terminal device 024. It may be understood that a quantity of terminal devices included in the communication system may be set based on an actual application scenario. For example, the communication system includes one terminal device or a plurality of terminal devices. This is not limited in this embodiment of this application. Processes in which the network device 01 performs CSI measurement with each terminal device are similar to each other. In this embodiment of this application, a process in which the network device 01 performs CSI measurement with any terminal device is used as an example for description.

In embodiments of this application, an execution body of the network device side method may be a network device, or may be an apparatus in the network device (it should be noted that, in embodiments provided in this application, description is provided by using an example in which the execution body is a network device). For example, the apparatus in the network device may be a chip system, a circuit, or a module. This is not limited in this application.

A network device in embodiments of this application may include but is not limited to a base station and a transmission reception point (TRxP). The base station is also referred to as a radio access network (RAN) device, and is a device that connects a terminal to a wireless network. The base station may be a base transceiver station (BTS) in a global system for mobile communications (GSM) or code division multiple access (CDMA), a NodeB (NB) in wideband code division multiple access (WCDMA), or may be an evolved NodeB (eNB or eNodeB) in long term evolution (LTE), a relay station or an access point, a gNodeB (gNB) in a future 5G network, or the like. This is not limited herein.

In embodiments of this application, an execution body of the terminal device (or referred to as a terminal) side method may be a terminal device, or may be an apparatus in the terminal device (it should be noted that, in embodiments provided in this application, description is provided by using an example in which the execution body is a terminal device). For example, the apparatus in the terminal device may be a chip system, a circuit, or a module. This is not limited in this application.

Embodiments of this application relate to a terminal device. The terminal may be a wireless terminal or a wired terminal. The wireless terminal may be a device that provides a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless device may be a device such as a personal communications service (PCS) phone, a cordless telephone set, a session initiation protocol (SIP) phone, a wireless local loop (, WLL) station, or a personal digital assistant (PDA). The wireless terminal may also be referred to as a system, a subscriber unit (, a subscriber station, a mobile station, a mobile console, a remote station, a remote terminal, an access terminal, a user terminal, a user agent, or a user device or user equipment (UE). This is not limited herein.

The terminal device or the network device in embodiments of this application may include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software.

In the communication system shown in FIG. 1, the network device may send downlink data to terminal devices UE 1 to UE 4, and the terminal devices UE 1 to UE 4 may also send uplink data to the network device.

Usually, in a wireless communication system, communication may be classified into different types based on different types of transmitting nodes and receiving nodes. For example, sending information by a network device to a terminal device is referred to as downlink (DL) communication, and sending information by a terminal device to a network device is referred to as uplink (UL) communication.

In a fourth generation (4G) wireless communication system and a fifth generation (5G) wireless communication system (or referred to as new radio access technology (NR) system), there are signals or channels such as a synchronization signal/physical broadcast channel (SS/PBCH), a channel state information reference signal (CSI-RS), a dedicated demodulation reference signal (DM-RS), a physical downlink control channel (PDCCH), and a physical downlink shared channel (PDSCH) in downlink.

When a base station serves as a network device and allocates a time-frequency resource to a terminal, to match a change of channel information and interference information between the base station and the terminal, channel state information (CSI) needs to be measured. The channel state information mainly includes a rank indicator (RI), a precoding indicator (PMI), a channel quality indicator (CQI), and the like. For example, in a CSI measurement process, the terminal measures channel quality at a current moment based on a CSI-RS sent by the base station, and then feeds back the channel quality to the base station.

Figure 2:
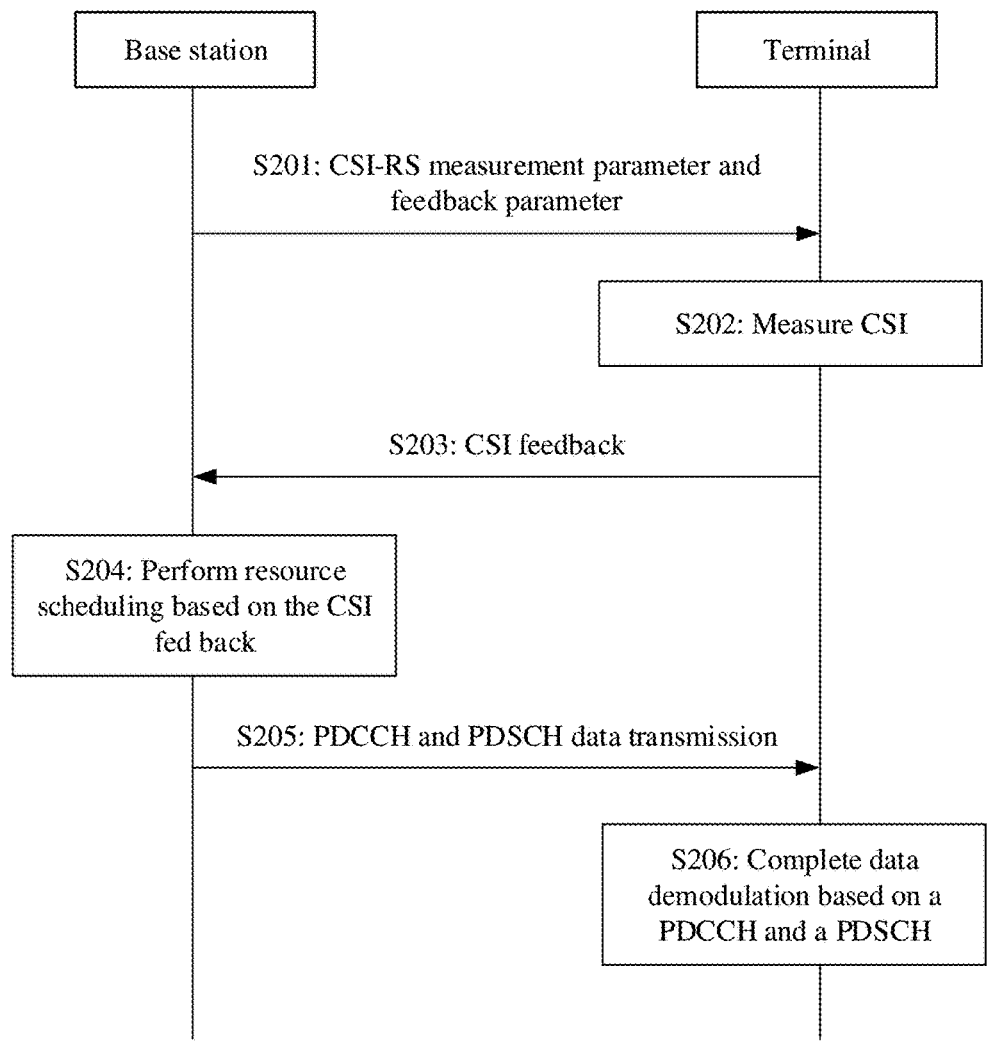
FIG. 2 is a schematic flowchart of a common state information measurement method.

For example, FIG. 2 is a schematic flowchart of common CSI measurement. As shown in FIG. 2, the CSI measurement may include the following steps.

S201: A base station configures a CSI-RS measurement parameter and a feedback parameter by using radio resource control (RRC) signaling. Related RRC information elements (Ies) mainly include CSI-MeasConfig, CSI-ResourceConfig, CSI-ReportConfig, and the like (for details, refer to 3GPP TS 38.331). Parameters of a CSI-RS resource need to be configured in CSI-MeasConfig, including a resource index, a quantity of ports, a time-frequency location, a time-frequency density, and the like. Feedback content is configured in a CSI-ReportConfig IE, including a CQI, a PMI, an RI feedback, and the like.

S202: A terminal performs CSI measurement based on CSI-RS resource measurement configuration information and CSI feedback content configuration information.

S203: The terminal feeds back CSI content, including the CQI, the PMI, the RI, and the like, through an uplink control channel or an uplink data channel S204: The base station performs scheduling based on CSI information fed back by the terminal, for example, completes time-frequency resource allocation, modulation and coding scheme (MCS) selection, and data transmission block size selection, and prepares for sending of a physical downlink control channel (PDCCH) and a physical downlink shared channel (PDSCH). The PDCCH indicates information about a time-frequency resource allocated to the terminal. The PDSCH is used to send service data.

S205: The base station sends the PDCCH and the PDSCH to the terminal.

S206: The terminal receives the PDCCH and the PDSCH, and completes data demodulation.

Configuration information of the CSI-RS resource is indicated by an RRC layer parameter CSI-ResourceConfig, and defines a CSI-RS resource set, a CSI-RS resource index, and the like. For detailed descriptions of each parameter in CSI-ResourceConfig, refer to 3GPP TS 38.331. Details are not described herein again. Different CSI-ResourceConfig configuration information may be distinguished between based on a CSI-ResourceConfigId parameter.

Feedback content of the CSI is configured by using an RRC layer parameter CSI-ReportConfig IE. For detailed descriptions of each parameter in the CSI-ReportConfig IE, refer to 3GPP TS 38.331. Details are not described herein again.

It should be noted that CSI-ReportConfig in the feedback content of the CSI and CSI-ResourceConfig in the configuration information of the CSI-RS resource are associated with each other. Content to be fed back in CSI-ReportConfig is obtained based on a CSI-RS resource configured in CSI-ResourceConfig. Both CSI-ReportConfig and CSI-ResourceConfig include CSI-ResourceConfigId, in other words, CSI-ReportConfig may find a corresponding CSI-RS resource configuration based on CSI-ResourceConfigId.

In addition, for a specific time-frequency location of the CSI-RS resource, refer to Table 7.4.1.5.3-1 in TS 3GPP TS 38.212. A current NR standard supports CSI measurement for a maximum of 32 antenna ports. The following uses 32 ports as an example to describe a time-frequency location configuration of a CSI-RS, as shown in Table 1. In the table, CDM-Type, time-domain symbols $l_0$ and $l_1$, and frequency-domain locations $k_0$ and $k_1$ are configured by an RRC layer parameter CSI-RS-ResourceMapping. A CSI-RS-ResourceMapping IE is included in each CSI-RS resource configuration, namely, an NZP-CSI-RS-Resource IE. In the NZP-CSI-RS-Resource IE, a parameter NZP-CSI-RS-ResourceId is used to distinguish between different CSI-RS resources. Specific values of NZP-CSI-RS-ResourceId that are included are indicated in a CSI-ResourceConfig IE.

TABLE 1

CSI-RS locations within a slot

| Row | Ports X | Density $\rho$ | CDM-Type | $(\bar{k}, \bar{l})$ | CDM group index j | k' | l' |
|---|---|---|---|---|---|---|---|
| 16 | 32 | 1, 0.5 | fd-CDM2 | $(k_0, l_0), (k_0, l_0), (k_2, l_0),$ $(k_3, l_0), (k_0, l_0 + 1),$ $(k_1, l_0 + 1), (k_2, l_0 + 1),$ $(k_3, l_0 + 1), (k_0, l_1),$ $(k_1, l_1), (k_2, l_1), (k_3, l_1),$ $(k_0, l_1 + 1), (k_1, l_1 + 1),$ $(k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4-FD2-TD2 | $(k_0, l_0), (k_1, l_0), (k_2, l_0),$ $(k_3, l_0), (k_0, l_1), (k_1, l_1),$ $(k_2, l_1), (k_3, l_1)$ | 0, 1, 2, 3, 4, 5, 6, 7 | 0, 1 | 0, 1 |
| 18 | 32 | 1, 0.5 | CDM8-FD2-TD4 | $(k_0, l_0), (k_1, l_0), (k_2, l_0),$ $(k_3, l_0)$ | 0, 1, 2, 3 | 0, 1 | 0, 1, 2, 3 |

Figure 3:
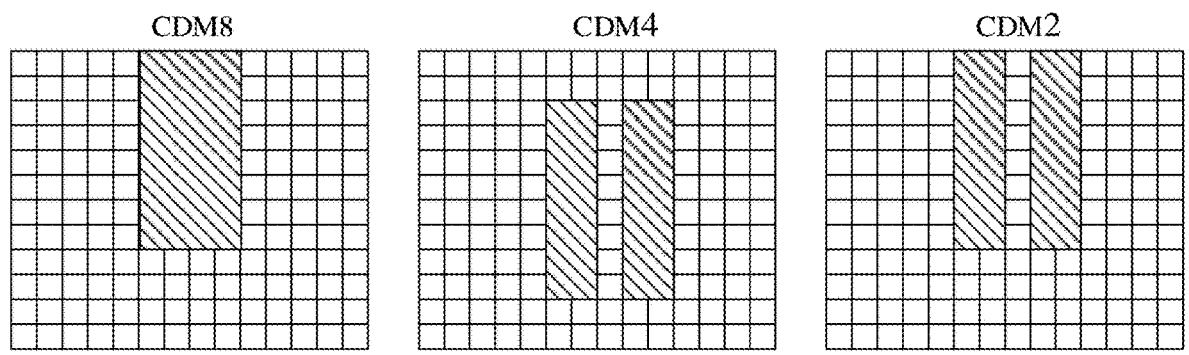
FIG. 3 is a schematic diagram of common time-frequency locations of a CSI-RS.

According to the three configurations of CDM8, CDM4, and CDM2 in the foregoing table (corresponding to row indexes 16, 17, and 18 in the table respectively), time-frequency locations of a CSI-RS are shown in FIG. 3. Each box in the figure represents a resource element (RE), that is, a subcarrier.

In a CSI measurement process, because a plurality of antennas are configured for a base station, CSI measurement for a plurality of antenna ports is usually supported. To measure a channel on each antenna port of the base station, a quantity of CSI-RS ports is usually configured to be the same as a quantity of antenna ports.

A typical quantity of CSI-RS ports is 2, 4, 8, 16, or 32. A larger quantity of CSI-RS antenna ports indicates a larger quantity of radio frequency channels of the base station and a stronger capability of parallel multi-stream data transmission. In a large-scale array antenna technology, a quantity of radio frequency channels may reach 32 or 64, and a maximum quantity of CSI-RS antenna ports may reach 32.

However, when a large quantity of ports are configured in CSI measurement, although a system capacity can be effectively improved, power consumption of a base station is large, and operation costs are high.

Through analysis, in total power consumption of the base station, a radio remote unit (RRU) accounts for nearly 70% to 80%. Power consumption of the RRU increases with a quantity of radio frequency channels. Usually, when CSI measurement is performed on a plurality of terminal devices, a larger quantity of resources configured for a CSI-RS indicates a larger quantity of occupied orthogonal frequency division multiplexing (OFDM) symbols and a larger quantity of radio frequency channels for sending OFDM symbols. Consequently, power consumption of the base station is large.

Based on this, in the CSI measurement provided in embodiments of this application, aggregated measurement is performed on a plurality of CSI-RS resources, so that a quantity of time domain symbols occupied by a CSI-RS during CSI measurement can be reduced. This helps a network device reduce energy consumption on a network side by using a time domain symbol power saving function, and makes it possible to reduce power consumption of the network device.

The CSI measurement method in embodiments of this application may be applied to the application scenario shown in FIG. 1, or may be applied to another communication system in which an uplink communication link and a downlink communication link exist. This is not specifically limited in embodiments of this application.

In embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

In embodiments of this application, "first", "second", "third", and the like may be used to distinguish between applications of described nouns in different scenarios. In actual application, "first", "second", "third", and the like may not be included, and do not constitute a limitation on embodiments of this application.

A channel measurement signal resource in embodiments of this application may indicate a time-frequency location, a quantity of antenna ports, and the like of a measurement signal. For example, the channel measurement signal resource may be a CSI-RS resource.

Aggregated measurement in embodiments of this application may be jointly measuring CSI of a high quantity of antenna ports by aggregating a plurality of channel measurement signal resources of a small quantity of antenna ports. A channel measurement signal may be, for example, a CSI-RS or another signal used for channel measurement. This is not specifically limited in embodiments of this application.

Aggregated CSI in embodiments of this application may be CSI obtained based on aggregated measurement. For example, the aggregated CSI is obtained by performing aggregated measurement on N CSI-RS resources. The aggregated CSI is CSI of M antenna ports. In this case, M is a sum of quantities of antenna ports of the N CSI-RS resources, and N is greater than or equal to 2. It may be understood that in embodiments of this application, a definition of aggregated CSI is used to distinguish the aggregated CSI from existing CSI, and to facilitate description of embodiments of this application. In actual application, "aggregated CSI" may be referred to as "CSI", or the like. This is not specifically limited in embodiments of this application.

The following describes in detail, by using example embodiments, the technical solutions of this application and how to resolve the foregoing technical problems by using the technical solutions of this application. The following embodiments may be implemented independently or combined with each other, and same or similar concepts or processes may not be repeatedly described in some embodiments.

Figure 4:
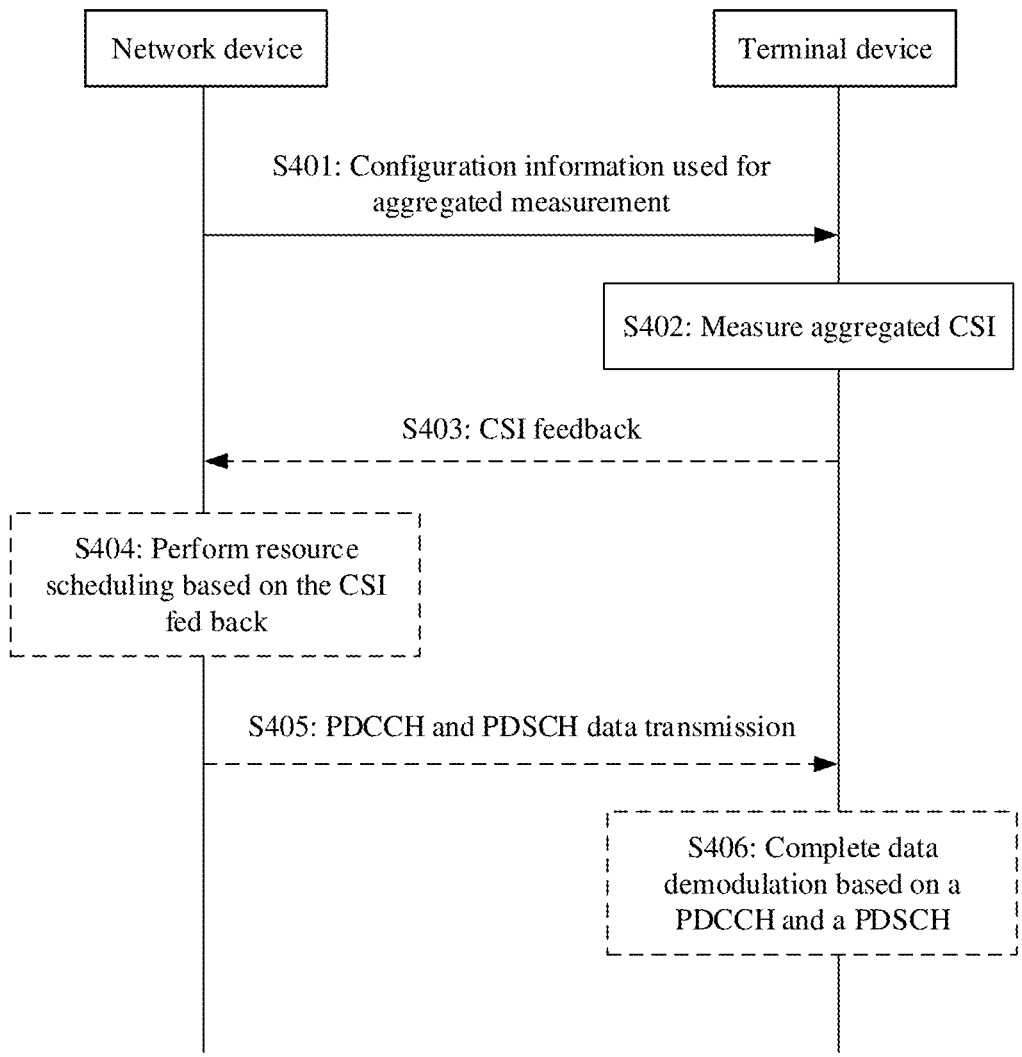
FIG. 4 is a schematic flowchart of a channel state information measurement method according to an embodiment of this application.

FIG. 4 is a schematic flowchart of a channel state information measurement method according to an embodiment of this application. As shown in FIG. 4, the method includes the following steps.

S401: A network device sends configuration information used for aggregated measurement to a terminal device.

In this embodiment of this application, the configuration information is generated by the network device, and the configuration information may include first indication information and second indication information. The first indication information indicates K channel measurement signal resources, and K is greater than or equal to 2. The second indication information indicates the terminal device is to measure aggregated CSI based on N channel measurement signal resources, and N is less than or equal to K.

The first indication information may include configuration information of the K channel measurement signal resources, for example, include one or more of information such as an index, a quantity of ports, a time-frequency location, a time offset, and periodic or aperiodic sending of a channel measurement signal resource. In this way, the terminal device may obtain, based on the first indication information, the K channel measurement signal resources for subsequent aggregated measurement.

The second indication information may be any character, number, or the like. When the configuration information includes the second indication information, the second indication information may indicate the terminal device is to measure the aggregated CSI based on the N channel measurement signal resources in the K channel measurement signal resources.

In a possible implementation, N is less than K, and the second indication information may include one or more indexes of the N channel measurement signal resources in the K channel measurement signal resources and indication information indicating to aggregate the N channel measurement signal resources to measure CSI.

In a possible implementation, N is equal to K, and the second indication information may include indication information indicating to aggregate the N channel measurement signal resources to measure CSI. For example, the second indication information may be information for enabling feedback for the aggregated CSI. When the second indication information is set to 1, CSI obtained through measurement based on an aggregated CSI-RS resource is enabled to be fed back. Specific CSI includes a CQI, a PMI, an RI, and the like. When the second indication information is set to 0, CSI obtained based on aggregated measurement does not need to be fed back.

In this embodiment of this application, the first indication information and the second indication information may be sent by using one piece of signaling, or may be sent by using a plurality of pieces of signaling. This is not specifically limited in this embodiment of this application.

For example, the network device may send, by using RRC signaling, the configuration information that includes the first indication information and the second indication information. The configuration information may include CSI-MeasConfig, CSI-ResourceConfig, a CSI-ReportConfig IE, and the like. CSI-MeasConfig and CSI-ResourceConfig may be configured by using a common solution. In CSI-ReportConfig, it is different from a common technical solution that, the first indication information and the second indication information may be configured in the parameter.

For example, fields "CSI-RS resource aggregation indication for channel measurement AggregatedCsiResourcesForChannelMeasurement" and "aggregated CSI feedback enabling information indication AggregatedCsiReportFlag" are added to the RRC parameter CSI-ReportConfig IE.

For example, the following is an example of RRC information parameter configuration for adding AggregatedCsiResourcesForChannelMeasurement and AggregatedCsiReportFlag to CSI-ReportConfig IE.

signaling or the like. The first indication information and the second indication information may alternatively be independent of common configuration information. In the foregoing example configuration process, a name of each parameter may alternatively be replaced with other content based on actual application. This is not specifically limited in this embodiment of this application.

In actual communication, because locations and channels of users are different, directions of beams sent by the network device to the terminal device are different. During CSI measurement, different beam directions are weighted on

```
-- ASN1START
-- TAG-CSI-REPORTCONFIG-START
CSI-ReportConfig ::=            SEQUENCE {
    reportConfigId                  CSI-ReportConfigId,
    carrier                         ServCellIndex
OPTIONAL,   -- Need S
    resourcesForChannelMeasurement  CSI-ResoureeConfigId,
    csi-IM-ResourcesForInterference CSI-ResoureeConfigId
OPTIONAL,   -- Need R
    nzp-CSI-RS-ResourcesForInterference CSI-ResoureeConfigId
OPTIONAL,   -- Need R
    reportConfigType
    reportQuantity                  CHOICE {
        none                            NULL,
        cri-RI-PMI-CQI                  NULL,
        cri-RI-i1                       NULL,
        cri-RI-i1-CQI                   SEQUENCE{
            pdsch-BundleSizeForCSI          ENUMERATED {n2,
n4}                             OPTIONAL    -- Need S
    },
        cri-RI-CQI                      NULL,
        cri-RSRP                        NULL,
        ssb-Index-RSRP                  NULL,
        cri-RI-LI-PMI-CQI               NULL
    },
    ......
    AggregatedCsiReportFlag ENUMERATED {0,1}
    AggregatedCsiResourcesForChannelMeasurement CSI-ResourceConfigId
    .......
-- TAG-CSI-REPORTCONFIG-STOP
-- ASN1STOP
```

A value of the AggregatedCsiResourcesForChannelMeasurement field may be CSI-ResourceConfigId. CSI-ResourceConfigId is associated with the CSI-ResourceConfig IE. For example, each CSI-ResourceConfig IE includes CSI-ResourceConfigId. A specific CSI-RS resource set is indicated in the CSI-ResourceConfig IE. The CSI-RS resource set includes a CSI-RS resource index, for example, a CSI-RS resource index NZP-CSI-RS-ResourceId. Different CSI-RS resources are distinguished between by using a parameter NZP-CSI-RS-ResourceI.

When AggregatedCsiReportFlag is set to 1, CSI information obtained through measurement based on the aggregated CSI-RS resource is enabled to be fed back. Specific CSI information includes a CQI, a PMI, an RI, and the like. When AggregatedCsiReportFlag is set to 0, no feedback is required.

In an example implementation, a time-frequency location of a CSI-RS may be configured by using an RRC layer parameter CSI-RS-ResourceMapping. A CSI-RS-ResourceMapping IE is included in each CSI-RS resource configuration, for example, an NZP-CSI-RS-Resource IE. In the NZP-CSI-RS-Resource IE, a parameter nzp-CSI-RS-ResourceId is used to distinguish between different CSI-RS resources. Specific values of nzp-CSI-RS-ResourceId that are included are indicated in a CSI-ResourceConfig IE.

It may be understood that the network device may alternatively send the configuration information by using other a CSI-RS to improve a beamforming gain. Therefore, when measuring a plurality of terminal devices, the network device may configure different CSI-RS resources for different terminal devices for measurement.

Figure 5:
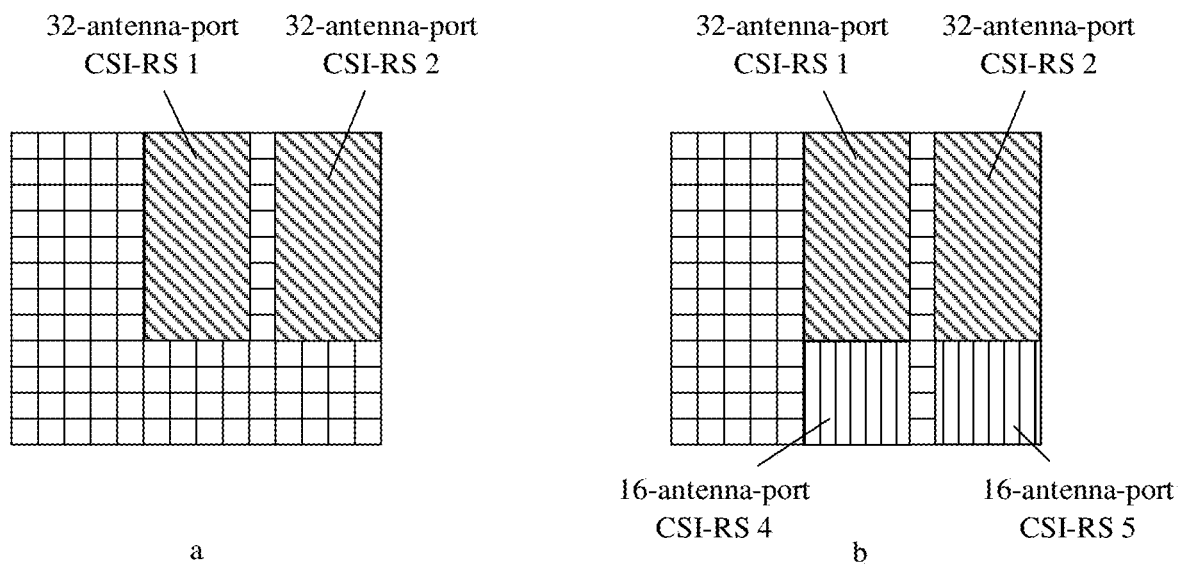
FIG. 5 is a schematic diagram of comparisons between time-frequency locations of two types of CSI-RSs.

FIG. 5 is a diagram of a comparison between possible time-frequency locations of CSI-RS resources when common CSI measurement is performed and a comparison between possible time-frequency locations of CSI-RS resources after CSI-RS resource aggregation.

FIG. 5a is a schematic diagram of possible time-frequency locations of CSI-RS resources when common CSI measurement is performed. A CSI-RS corresponds to 32 antenna ports. FIG. 5a shows time-frequency locations of two CSI-RS resources. Each box represents one resource element (RE). If a CSI-RS resource 1 is allocated to a terminal 1, and a CSI-RS resource 2 is allocated to a terminal 2, and if a CSI-RS resource 3 needs to be used to measure a terminal 3, only 16 REs remain in four OFDM symbols of the CSI-RS resource 1, and can further support only a 16-antenna-port CSI-RS resource, and only 16 REs remain in four OFDM symbols of the CSI-RS resource 3, and can further support only a 16-antenna-port CSI-RS resource. Therefore, the 32-antenna-port CSI-RS resource 3 can be measured only in a next slot. That is, in common CSI measurement, a total of 12 OFDM symbols are required for measuring three terminals.

FIG. 5b is a diagram of a comparison between possible time-frequency locations of CSI-RS resources after CSI-RS resource aggregation. If a CSI-RS resource 1 is allocated to a terminal 1, and a CSI-RS resource 2 is allocated to a terminal 2, and if a CSI-RS resource 3 needs to be used to measure a terminal 3, two 16-antenna-port CSI-RS resources (for example, a CSI-RS 4 and a CSI-RS 5) may be configured to be aggregated into one 32-antenna-port CSI-RS resource 3, and the two 16-antenna-port CSI-RS resources may respectively share an OFDM symbol with the CSI-RS resource 1 and the CSI-RS resource 3. In this way, CSI measurement for three terminals may be completed by using eight OFDM symbols, so that a quantity of OFDM symbols is saved.

Figure 6:
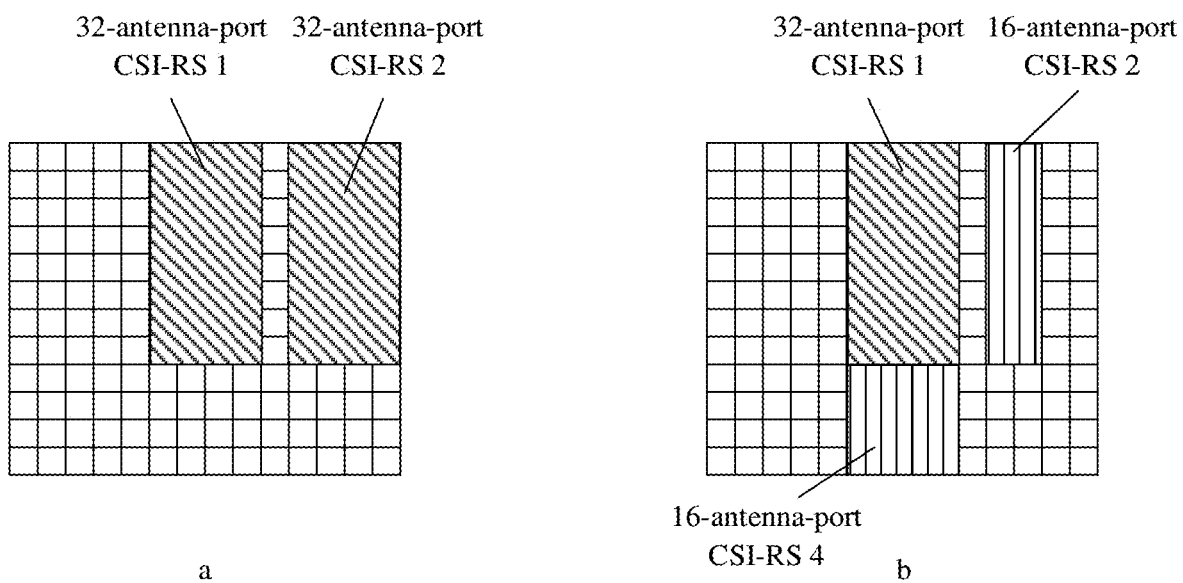
FIG. 6 is another schematic diagram of comparisons between time-frequency locations of two types of CSI-RSs.

FIG. 6 is another diagram of a comparison between possible time-frequency locations of CSI-RS resources when common CSI measurement is performed and a comparison between possible time-frequency locations of CSI-RS resources after CSI-RS resource aggregation.

FIG. 6a is a schematic diagram of possible time-frequency locations of CSI-RS resources when common CSI measurement is performed. A CSI-RS corresponds to 32 antenna ports. Eight OFDM symbols are required for configuring two 32-antenna-port CSI-RS resources.

FIG. 6b is a diagram of a comparison between possible time-frequency locations of CSI-RS resources after CSI-RS resource aggregation. By aggregating two 16-antenna-port CSI-RS resources, measurement for two pieces of 32-antenna-port CSI can be completed by using only six OFDM symbols.

In this embodiment of this application, CSI information of 64 antenna ports may be measured by using an aggregated measurement method, for example, by using two 32-antenna-port CSI-RS resources, four 16-antenna-port CSI-RS resources, or one 32-antenna-port CSI-RS resource and two 16-antenna-port CSI-RS resources. However, in an existing technical solution, measurement for CSI information of 64 antenna ports or more antenna ports is not supported.

It may be understood that there are still many examples of using a plurality of CSI-RS resources for aggregated CSI measurement. Aggregation may be adapted based on an actual application scenario, and examples are not described one by one herein.

Further, the network device may disable a radio frequency channel that does not send an OFDM symbol, or disable a power amplifier (PA), an intermediate frequency, a radio frequency unit, a filter, or the like on a radio frequency channel, so that energy consumption of the network device can be reduced.

S402: The terminal device measures the aggregated CSI.

In this embodiment of this application, the terminal device may measure CSI information based on two or more CSI-RS resources and the configuration information, for example, measure CSI information of 32 antenna ports based on two 16-antenna-port CSI-RS resources. For another example, CSI information of 64 antenna ports is measured based on two 32-antenna-port CSI-RS resources, and CSI information of 96 antenna ports is measured based on two 16-antenna-port CSI-RS resources and two 32-antenna-port CSI-RS resources.

For example, the terminal device may calculate the aggregated CSI by using the following information channels corresponding to N multi-antenna-port resources, a weight coefficient on a receive antenna of the terminal device, a precoder obtained by the terminal device through measurement, an interference covariance matrix, and a noise variance.

For example, in FIG. 5b, CSI of 32 ports is measured by using two 16-antenna-port CSI-RS resources.

Assuming that a channel corresponding to a 16-antenna-port CSI-RS resource 1 is $H_1$ and transmit power is p, and a channel corresponding to a 16-antenna-port CSI-RS resource 2 is $H_2$ and transmit power is p, a signal to interference plus noise ratio calculation process is as follows.

A signal to interference plus noise ratio (SINR) $\gamma_1$ calculated based on one 16-antenna-port CSI-RS resource 1 may meet a formula (1).

$$\gamma_1 = \frac{p(w_1 H_1 v_1)(w_1 H_1 v_1)^H}{(w_1(I_1 + \sigma^2))(w_1(I_1 + \sigma^2))^H} \quad (1)$$

$w_1$ is a weight coefficient on a receive antenna of a terminal, $v_1$ is precoder obtained through measurement, $I_1$ is an interference covariance matrix, and $\sigma^2$ is a noise variance (that is, noise power). It may be understood that the foregoing formula may be a signal to interference plus noise ratio of an RE, and may be a common method for calculating an SINR.

A signal to interference plus noise ratio of the 16-antenna-port CSI-RS resource 2 may also be calculated by using the method for calculating the 16-antenna-port CSI-RS resource 1. Details are not described herein again.

In this way, the terminal device may calculate the aggregated CSI based on two 16-antenna-port CSI-RS resources. For example, calculation of an aggregated SINR ($\gamma_{aggregaed}$) may meet a formula (2).

$$\gamma_{aggregaed} = \frac{p\,(w[H1\ H2]v)\,(w[H1\ H2]v)^H}{(w(1+\sigma^2))\,(w(1+\sigma^2))^H} \quad (2)$$

w is a weight coefficient on a receive antenna of the terminal device, v is precoder obtained through measurement, and I is an interference covariance matrix. It is different from the formula (1) that, the channel is a channel obtained through measurement based on two 16-antenna-port CSI-RS resources. In addition, because a dimension of a channel changes, a corresponding precoding matrix v and a corresponding receiving weight coefficient w change correspondingly. Calculation of the precoding matrix v also depends on an aggregated channel [H1 H2]. For example, in one method, an eigen vector may be obtained through decomposition of an eigen value of a channel and used as precoder, and in another method, precoder may be obtained by using a codebook-based method.

Based on an SINR of each RE, an SINR of each subband (including a plurality of consecutive RBs) can be calculated. Then, a CQI index of each subband can be determined by querying an SINR threshold corresponding to each modulation scheme and code rate in a CQI table. Finally, the CSI obtained by the terminal device through measurement based on the aggregated CSI-RS resource includes an RI, a PMI, an RI, and the like, and the CSI obtained through aggregated measurement is fed back to the network device.

In conclusion, in this embodiment of this application, a manner of performing aggregated measurement on a plurality of channel measurement signal resources can reduce occupation of OFDM symbols. This helps a network device reduce energy consumption on a network side by using a time domain symbol power saving function, and makes it possible to reduce power consumption of the network device. In addition, CSI measurement with 64 antenna ports or more than 64 antenna ports can be supported through aggregation of channel measurement signal resources. This helps increase a system capacity, then may reduce data transmission time and save energy for a base station.

Optionally, the method may further include the following steps.

S403: The terminal device sends the aggregated CSI to the network device.

In this embodiment of this application, the terminal device may feed back the aggregated CSI to the network device based on an indication for enabling feedback for the aggregated CSI.

Optionally, the terminal device may alternatively feed back CSI corresponding to one or more multi-channel measurement signal resources in the N channel measurement signal resources. This is used as a reference for the network device during subsequent resource scheduling. This is not specifically limited in this embodiment of this application.

S404: The network device performs resource scheduling based on the CSI fed back by the terminal device.

In this embodiment of this application, the network device may perform resource scheduling in any form based on the CSI fed back by the base station. This is not specifically limited in this embodiment of this application.

For example, when the network device configures the aggregated measurement and feedback indication information by using the RRC signaling, the base station side assumes that the received CSI information fed back by the terminal is a result obtained based on the aggregated CSI-RS resource. When a PDSCH is sent, precoder used when data carried on the PDSCH channel is mapped to an antenna port is the precoder in the formula (2), and during MCS selection, a CQI may be obtained based on the SINR in the formula (2). A process of mapping transmission data onto each antenna port may meet a formula (3).

$$\begin{bmatrix} z^{(p_0)}(i) \\ \vdots \\ z^{(p_{\rho-1})}(i) \end{bmatrix} = v \begin{bmatrix} y^{(0)}(i) \\ \vdots \\ y^{(j-1)}(i) \end{bmatrix} \quad (3)$$

v is precoder obtained through measurement based on an aggregated CSI-RS, $y^{(j-1)}(i)$ is data mapped on a layer j−1 before precoding, $z^{(p_{\rho-1})}(i)$ is data mapped over an antenna port $P_{\rho-1}$ after precoding, and j is less than or equal to Rank fed back by the terminal device. FIG. 5b is used as an example, and v is obtained through measurement based on two 16-antenna-port CSI-RS resources.

In an example application, when the network device does not configure the aggregated measurement and the feedback indication information, the network device may use the CSI information by using an existing technical solution.

S405: The network device indicates DCI information to the terminal device through a PDCCH, and sends data through the PDSCH.

S406: The terminal device demodulates the PDSCH data based on the DCI carried on the PDCCH.

S405 and S406 may be implemented based on a common method. Details are not described herein again.

Figure 7:
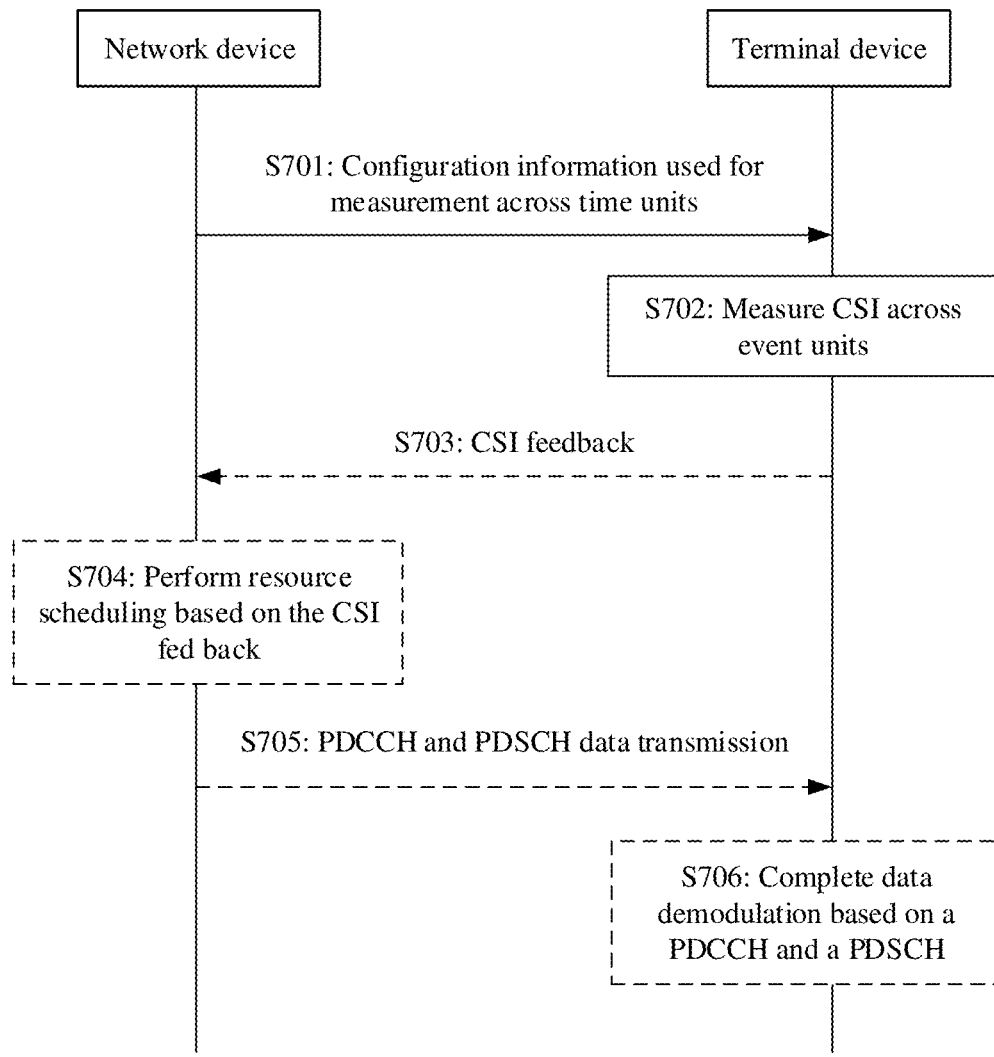
FIG. 7 is a schematic flowchart of another channel state information measurement method according to an embodiment of this application.

FIG. 7 is a schematic flowchart of a channel state information measurement method according to an embodiment of this application. As shown in FIG. 7, the method includes the following steps.

S701: A network device sends, to a terminal device, configuration information used for measurement across time units.

A time unit in this embodiment of this application may be a slot, a subframe, or the like. The measurement across time units means that CSI measurement is based on CSI-RS resources in two or more time units.

It should be noted that, for ease of description, in this embodiment of this application, CSI measurement across slots is used as an example subsequently to describe a process of measuring CSI. In an example application, one slot in NR includes 14 OFDM symbols in time domain, and one slot in LTE includes seven OFDM symbols.

In this embodiment of this application, the configuration information may include third indication information. The third indication information indicates the terminal device is to measure CSI in a plurality of time units.

For example, the third indication information may include a time unit offset parameter, in this case, the third indication information may indicate a channel measurement signal resource of a current time unit and a channel measurement signal resource of a time unit that is offset from the current time unit by the time unit offset parameter.

Alternatively, the third indication information includes one or more time units, and a time unit offset parameter corresponding to each time unit. In this case, a channel measurement signal resource of any one or more time units and a channel measurement signal resource of a time unit that is offset from the time unit by the time unit offset parameter may be indicated.

For example, the third indication information may include a time unit n and a time unit offset parameter t, and t is a natural number. In this case, two CSI-RS resources may be respectively configured in the time unit n and a time unit n+t. There may be one or more time units, and there may be one or more time unit offset parameters corresponding to any time unit. This is not specifically limited in this embodiment of this application. For example, the third indication information may include a time unit slot n, time unit offset parameters t and t+2 corresponding to the slot n, a time unit slot m, and a time unit offset parameter k corresponding to the slot m, so that CSI-RS resources are configured in at least two slots.

In this embodiment of this application, for example, the time unit is a slot, the time unit offset parameter is a slot offset parameter, and the channel measurement signal resource is a CSI-RS resource. Different CSI-RS resources may be sent in different slots, and a slot offset may be indicated by using a CSI-ResourcePeriodicityAndOffset IE. For example, this may be shown as follows.

CSI-ResourcePeriodicityAndOffset information element
-- ASN1START
--TAG-CSI-RESOURCEPERIODICITYANDOFFSET-START
CSI-ResourcePeriodicityAndOffset ::=    CHOICE {
    slots4                              INTEGER (0..3),
    slots5                              INTEGER (0..4),
    slots8                              INTEGER (0..7),
    slots10                           INTEGER (0..9),
    slots16                           INTEGER (0..15),
    slots20                           INTEGER (0..19),
    slots32                           INTEGER (0..31),
    slots40                           INTEGER (0..39),
    slots64                           INTEGER (0..63),
    slots80                           INTEGER (0..79),
    slots160                        INTEGER (0..159), -continued

```
    slots320                        INTEGER (0..319),
    slots640                        INTEGER (0..639)
}
--TAG-CSI-RESOURCEPERIODICITYANDOFFSET-STOP
-- ASN1STOP
```

Slots 4 indicates that a CSI-RS sending periodicity is four slots, and a specific slot in the four slots and in which a CSI-RS is sent is determined by a slot offset value, that is, candidate slot offset locations are {0, 1, 2, 3}.

When the slot offset value is less than the CSI-RS sending periodicity, an existing CSI measurement solution may be directly used.

When the slot offset value is greater than the CSI-RS sending periodicity, assuming that the sending periodicity is four slots, a CSI-RS resource 1 is sent in a slot n, and a CSI-RS resource 2 is sent in a slot n+5. However, because the periodicity is 4, the CSI-RS resource 2 is also sent in a slot n+1. Therefore, the CSI-RS resources in the slot n and the slot n+1 may be directly used to perform aggregated measurement.

When the slot offset value is equal to the CSI-RS sending periodicity, the third indication information may include indication information indicating periodic measurement. For example, one field periodNumberForCrossSlotAgrregation may be added to a CSI-ReportConfig IE to identify whether to perform CSI-RS aggregated measurement on a periodic resource. A value of the field periodNumberForCrossSlot-Agrregation may be a positive integer. For example, if the value is 2, it indicates that aggregated measurement is performed on CSI-RS resources in two consecutive periods. This may be described as follows.

resource in one slot occupies excessive time-frequency resources to simultaneously measure a plurality of terminal devices. A quantity of time domain symbols occupied by a CSI-RS may be reduced.

Figure 8:
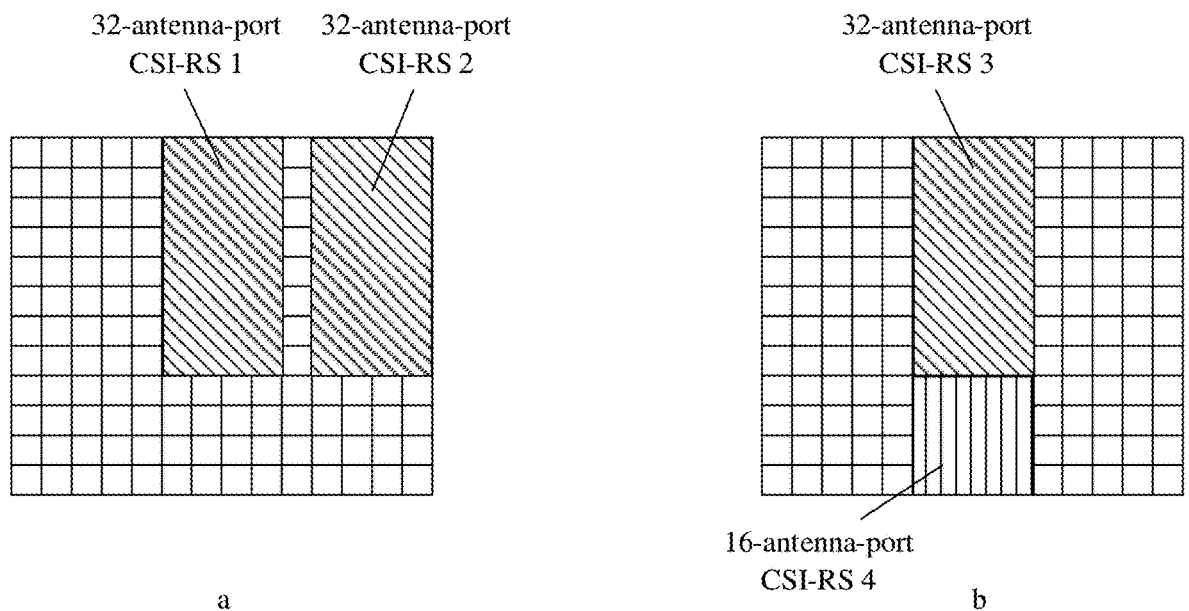
FIG. 8 is a schematic diagram of measuring a plurality of terminal devices based on CSI-RS resources in two slots.

For example, FIG. 8 is a schematic diagram of measuring a plurality of terminal devices based on CSI-RS resources in two slots.

FIG. 8a may be a slot n, and FIG. 8b may be a slot n+1. If a CSI-RS resource 1 is allocated to a terminal 1, and a CSI-RS resource 2 is allocated to a terminal 2, and if a CSI-RS resource 3 needs to be allocated to a terminal 3, this cannot be supported in the slot n, and only one 16-antenna-port CSI-RS 1 is occupied in the slot n+1, it may be indicated that the CSI-RS resource 3 shares an OFDM symbol with the 16-antenna-port CSI-RS 1 in the slot n+1. Therefore, other four OFDM symbols may not be allocated, that is, some resources in the plurality of time units are used by the terminal device to measure aggregated CSI, and remaining resources in the plurality of time units are used by another device to measure the CSI, so that a quantity of OFDM symbols may be saved.

It may be understood that for one terminal device, a network device may alternatively indicate the terminal device is to measure CSI based on CSI-RS resources in a plurality of time units. Details are not described herein.

S702: The terminal device measures the CSI across time units.

Optionally, the method may further include the following steps.

S703: The terminal device sends the CSI to the network device.

S704: The network device performs resource scheduling based on the CSI fed back by the terminal device.

```
CSI-ReportConfig information element
-- ASN1START
-- TAG-CSI-REPORTCONFIG-START
        CSI-ReportConfig ::=            SEQUENCE {
            reportConfigId                  CSI-ReportConfigId,
            carrier                         ServCellIndex
OPTIONAL,   -- Need S
            resourcesForChannelMeasurement  CSI-ResoureeConfigId,
            csi-IM-ResourcesForInterference CSI-ResoureeConfigId
OPTIONAL,   --Need R
            nzp-CSI-RS-ResourcesForInterference  CSI-ResoureeConfigId
OPTIONAL,   --Need R
            reportConfigType
            reportQuantity                  CHOICE {
                none                            NULL,
                cri-RI-PMI-CQI                  NULL,
                cri-RI-i1                       NULL,
                cri-RI-i1-CQI                   SEQUENCE {
                    pdsch-BundleSizeForCSI          ENUMERATED {n2,
n4}                                         OPTIONAL   --Need S
                },
                cri-RI-CQI                      NULL,
                cri-RSRP                        NULL,
                ssb-Index-RSRP                  NULL,
                cri-RI-LI-PMI-CQI               NULL
            },
            ......
            AggregatedCsiReportFlag ENUMERATED {0,1}
            AggregatedCsiResourcesForChannelMeasurement CSI-ResoureeConfigId
            periodNumberForCrossSlotAgrregation    ENUMERATED {2,3,N}
            .......
-- TAG-CSI-REPORTCONFIG-STOP
-- ASN1STOP
```

It should be noted that CSI measurement in this embodiment of this application is based on CSI-RS resources in two or more slots, so as to avoid a case in which a CSI-RS S705: The network device indicates DCI information to the terminal device through a PDCCH, and sends data through a PDSCH.

S706: The terminal device demodulates the PDSCH data based on the DCI carried on the PDCCH.

In this embodiment of this application, S702, S703, S704, S705, and S706 may all be implemented in any common manner. Details are not described herein again.

It should be noted that the embodiment corresponding to FIG. 7 may be independently implemented, and an effect of saving OFDM symbols is achieved by measurement across time units. Further, the network device may disable a radio frequency channel that does not send an OFDM symbol, or disable a power amplifier (PA), an intermediate frequency, a radio frequency unit, a filter, or the like on a radio frequency channel, so that energy consumption of the network device can be reduced.

Alternatively, the embodiment corresponding to FIG. 7 may be implemented in combination with the embodiment corresponding to FIG. 4. For example, a terminal may be indicated to measure aggregated CSI in a plurality of time units.

According to the embodiment corresponding to FIG. 4, the embodiment corresponding to FIG. 7, or an embodiment combining the embodiment corresponding to FIG. 7 and the embodiment corresponding to FIG. 4, a radio frequency channel may be dynamically enabled or disabled as service load changes. Therefore, the terminal device may need to know whether to continue to measure CSI by using an aggregation method or measure CSI based on a single CSI-RS resource.

For example, when load is high, more radio frequency channels may be used to increase a system capacity, and when load is low, some channels may be shut down to reduce energy consumption of a base station. In this case, the terminal device needs to measure CSI information on different radio frequency channels, so that the base station determines whether to enable or disable a radio frequency channel.

Figure 9:
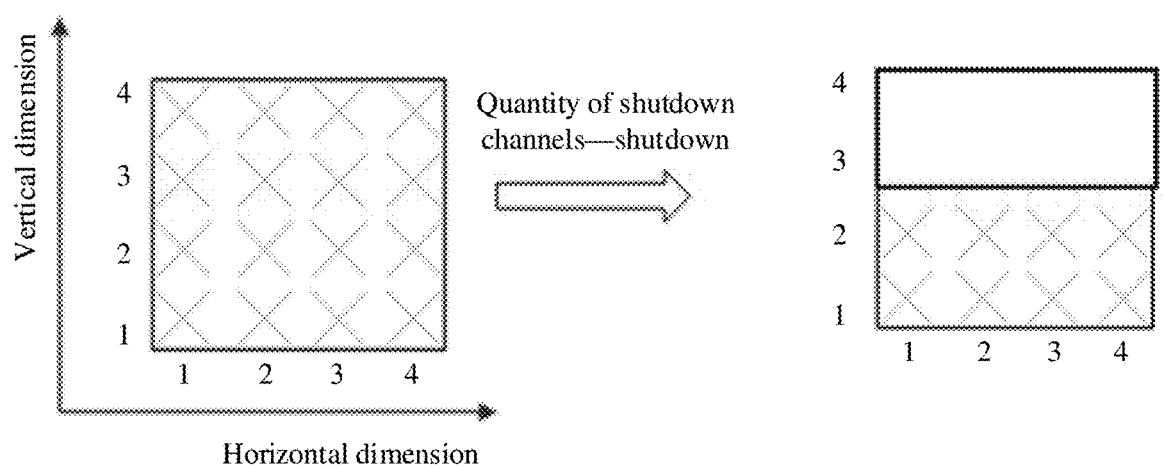
FIG. 9 is a schematic diagram of a change of antenna ports of a network device.

For example, a change of antenna ports is shown in FIG. 9. In FIG. 9, slashes in different directions indicate different antenna polarization directions, and each antenna corresponds to one radio frequency channel.

Enabling or disabling of a radio frequency channel is abrupt, and may not be a periodic operation. Therefore, during CSI measurement, aperiodic triggering needs to be performed to notify a terminal of a specific antenna port whose CSI information needs to be measured.

It is assumed that the network device initially has 32 antenna ports. After 16 antenna ports are disabled, the terminal device needs to know whether to continue to measure CSI by using an aggregation method or measure CSI based on a single CSI-RS resource.

For this problem, in a possible implementation, the network device may send fourth indication information to the terminal device, to activate aggregated measurement or "deactivate" (that is, disable aggregated measurement) aggregated measurement.

For example, as shown in Table 2, one new field may be introduced into DCI signaling to activate aggregated measurement or "deactivate" aggregated measurement.

TABLE 2

| Field | Function |
| --- | --- |
| AggregationTriggerFlag | A value is 0 or 1. 0 indicates that CSI aggregated measurement is not performed, and 1 indicates that CSI measurement is performed. |

When AggregationTriggerFlag is set to 0, the terminal device does not perform aggregated measurement on a plurality of CSI-RS resources, but directly performs CSI measurement based on a closest CSI-RS resource. CSI fed back is also information obtained through measurement based on one CSI-RS resource. When AggregationTriggerFlag is set to 1, the terminal device measures aggregated CSI based on a plurality of CSI-RS resources, and feeds back the aggregated CSI to the network device.

In a possible implementation, the network device may select to activate some CSI-RS resources used for aggregation, to measure the CSI. The network device may send fifth indication information to the terminal device, to activate some CSI-RS resources or deactivate some CSI-RS resources to perform aggregated measurement. For example, there are N preconfigured CSI-RS resources used for aggregated measurement, and only N1 of the N CSI-RS resources are activated or deactivated, where N1 is less than or equal to N.

For example, a new field may be introduced into the DCI signaling or a redundant bit of an existing field may be used, to activate a CSI-RS resource of aggregated measurement or "deactivate" (that is, disable aggregated measurement) a CSI-RS resource of aggregated measurement. In one method, a to-be-activated or "to-be-deactivated" CSI-RS resource is indicated in a bitmap manner. For example, if N CSI-RS resources are preconfigured for aggregated measurement, N bits are used to indicate a status of a corresponding CSI-RS resource. When a value of the $1^{st}$ bit is 0, it indicates that the $1^{st}$ CSI-RS resource is "deactivated". When a value of the $1^{st}$ bit is 1, it indicates that the $1^{st}$ CSI-RS resource is activated. By analogy, a bit at each location indicates a status of a corresponding CSI-RS resource. One numbering rule is that the N CSI-RS resources are sorted in ascending order of indexes of the CSI-RS resources. A CSI-RS resource with a lowest index corresponds to the $1^{st}$ bit location, and a CSI-RS resource with a highest index corresponds to the $N^{th}$ bit location.

Further, the network device may determine, based on configurations of RRC signaling and DCI signaling, whether CSI content fed back by the terminal device is obtained through measurement based on an aggregated CSI-RS or a single CSI-RS.

In this embodiment of this application, a dynamic change of an antenna port may be adapted. For example, when a quantity of antenna ports reduces from 32 to 16, one resource in an aggregated CSI-RS resource may be directly used for measurement. When a quantity of antenna ports increases from 16 to 32, two or more aggregated CSI-RS resources may be used for measurement. This avoids repeatedly configuring CSI-RS resources of different antenna ports and corresponding measurement and feedback information for a plurality of times.

Figure 10:
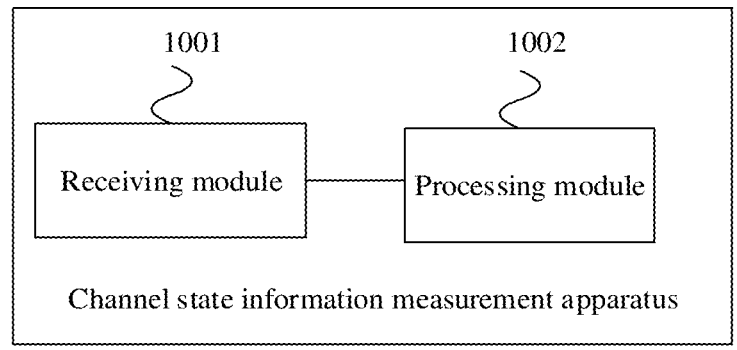
FIG. 10 is a schematic diagram of a structure of a channel state information measurement apparatus according to an embodiment of this application.

FIG. 10 is a schematic diagram of a structure of a channel state information measurement apparatus according to an embodiment of this application. The channel state information measurement apparatus in this embodiment of this application includes a receiving module 1001 and a processing module 1002. The receiving module is configured to receive configuration information from a network device, where the configuration information includes first indication information and second indication information, the first indication information indicates K channel measurement signal resources, K is greater than or equal to 2, the second indication information indicates the terminal device is to measure aggregated CSI based on N channel measurement signal resources, and N is less than or equal to K. The processing module is configured to measure the N channel measurement signal resources based on the configuration information, and obtain the aggregated CSI through calculation based on N measurement results. The aggregated CSI is CSI of M antenna ports, and M is a sum of quantities of antenna ports of the N channel measurement signal resources.

In a possible design, N is less than K, and the second indication information includes one or more indexes of the N channel measurement signal resources in the K channel measurement signal resources and indication information indicating aggregated CSI measurement.

In a possible design, the second indication information is information for enabling feedback for the aggregated CSI, and the apparatus further includes: a sending module, configured to send the aggregated CSI to the network device based on the second indication information.

In a possible design, the processing module is configured to calculate the aggregated CSI by using the following information: channels corresponding to N multi-antenna-port resources, a weight coefficient on a receive antenna of the terminal device, a precoder obtained by the terminal device through measurement, an interference covariance matrix, and a noise variance.

In a possible design, the configuration information further includes third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI.

In a possible design, the third indication information includes a time unit offset parameter.

In a possible design, the third indication information includes one or more time units, and a time unit offset parameter corresponding to each time unit.

In a possible design, the third indication information includes indication information indicating periodic measurement.

In a possible design, the receiving module is further configured to receive fourth indication information from the network device, where the fourth indication information is used to activate or deactivate aggregated measurement.

In a possible design, the receiving module is configured to receive fifth indication information from the network device, where the fifth indication information is used to activate or deactivate N1 channel measurement signal resources for aggregated measurement, and N1 is less than or equal to N.

In a possible design, the sending module is further configured to send CSI corresponding to one or more of the N channel measurement signal resources to the network device.

For beneficial effects of this embodiment of this application, refer to descriptions of the method embodiment corresponding to the terminal device. Details are not described herein again.

Figure 11:
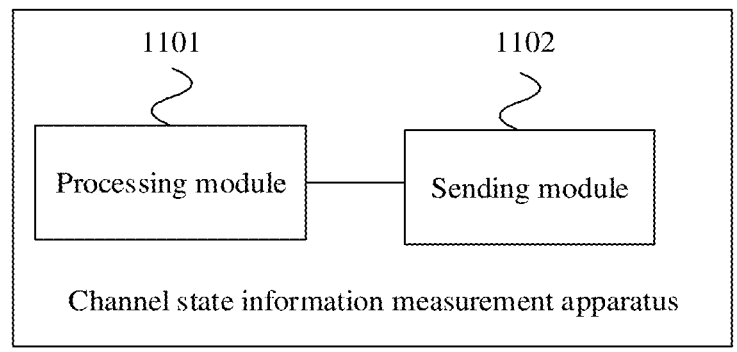
FIG. 11 is a schematic diagram of a structure of another channel state information measurement apparatus according to an embodiment of this application.

FIG. 11 is a schematic diagram of a structure of a channel state information measurement apparatus according to an embodiment of this application. The channel state information measurement apparatus in this embodiment of this application includes a processing module 1101 and a sending module 1102. The processing module is configured to generate configuration information, where the configuration information includes first indication information and second indication information, the first indication information indicates K channel measurement signal resources, K is greater than or equal to 2, the second indication information indicates a terminal device is to measure aggregated CSI based on N channel measurement signal resources, and N is less than or equal to K. The sending module is configured to send the configuration information to the terminal device.

In a possible design, N is less than K, and the second indication information includes one or more indexes of the N channel measurement signal resources in the K channel measurement signal resources and indication information indicating aggregated CSI measurement.

In a possible design, the second indication information is information for enabling feedback for the aggregated CSI, and the apparatus further includes: a receiving module, configured to receive the aggregated CSI from the terminal device, where the aggregated CSI is CSI of M antenna ports, and M is a sum of quantities of antenna ports of the N channel measurement signal resources.

In a possible design, the configuration information further includes third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI.

In a possible design, the third indication information includes a time unit offset parameter.

In a possible design, the third indication information includes one or more time units, and a time unit offset parameter corresponding to each time unit.

In a possible design, the third indication information includes indication information indicating to perform aggregated measurement on channel measurement signal resources in a plurality of periods.

In a possible design, the apparatus further includes: The network device disables a radio frequency channel that does not send an orthogonal frequency division multiplexing OFDM symbol.

In a possible design, the sending module is further configured to send fourth indication information to the terminal device, where the fourth indication information is used to activate or deactivate aggregated measurement.

In a possible design, the sending module is further configured to send fifth indication information to the terminal device, where the fifth indication information is used to activate or deactivate N1 channel measurement signal resources for aggregated measurement, and N1 is less than or equal to N.

In a possible design, the receiving module is configured to receive CSI corresponding to one or more multi-channel measurement signal resources in the N channel measurement signal resources.

For beneficial effects of this embodiment of this application, refer to descriptions of the method embodiment corresponding to the network device. Details are not described herein again.

Figure 12:
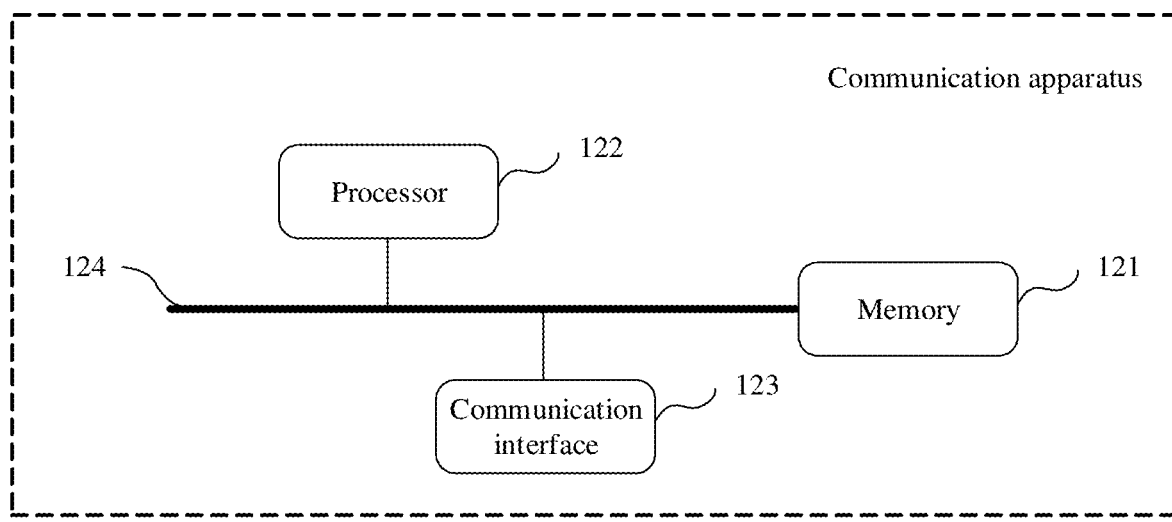
FIG. 12 is a schematic diagram of a hardware structure of a communication apparatus according to an embodiment of this application.

FIG. 12 is a schematic diagram of a hardware structure of a communication apparatus according to an embodiment of this application. As shown in FIG. 12, a communication apparatus 12 includes a memory 121, a processor 122, and a communication interface 123. The memory 121, the processor 122, and the communication interface 123 may communicate with each other. For example, the memory 121, the processor 122, and the communication interface 123 may communicate with each other through a communication bus 124. The memory 121 is configured to store a computer program, and the processor 122 executes the computer program to implement the method shown in the embodiment shown in FIG. 4 or FIG. 7.

Optionally, the communication interface 123 may further include a transmitter and/or a receiver.

Optionally, the processor may be a central processing unit (CPU), another general-purpose processor, a digital signal processor (DSP), an application-specific integrated circuit (ASIC), or the like. The general-purpose processor may be a microprocessor, or the processor may be any conventional processor or the like. The steps in the methods disclosed with reference to embodiments of this application may be directly performed by a hardware processor, or may be performed by a combination of hardware in the processor and a software module.

An embodiment of this application provides a computer-readable storage medium. The computer-readable storage medium is configured to store a computer program. The computer program is used to implement the method shown in the embodiment shown in FIG. 4 or FIG. 7.

An embodiment of this application further provides a communication system, including the channel state information measurement apparatus in FIG. 10 and the channel state information measurement apparatus in FIG. 11.

An embodiment of this application further provides a system on chip. The system on chip is configured to support a communication apparatus in implementing functions (for example, a terminal device receives configuration information from a network device, where the configuration information includes first indication information and second indication information, the first indication information indicates K channel measurement signal resources, K is greater than or equal to 2, the second indication information indicates the terminal device is to measure aggregated CSI based on N channel measurement signal resources, and N is less than or equal to K; and the terminal device measures the N channel measurement signal resources based on the configuration information, and obtains the aggregated CSI through calculation based on N measurement results, where the aggregated CSI is CSI of M antenna ports, and M is a sum of quantities of antenna ports of the N channel measurement signal resources) shown in embodiments of this application. The chip is, for example, used in a chip system. The chip system may include a chip, or may include a chip and another discrete component. When the foregoing method is implemented by using a chip in a first device, the chip includes a processing unit. Further, the chip may further include a communication unit. The processing unit may be, for example, a processor. When the chip includes the communication unit, the communication unit may be, for example, an input/output interface, a pin, or a circuit. The processing unit performs all or a part of actions performed by each processing module in embodiments of this application. The communication unit may perform a corresponding receiving or sending action, for example, the communication unit may receive configuration signaling sent by the network device. In another embodiment, in this embodiment of this application, a processing module of a receiving device may be the processing unit of the chip, and a receiving module or a sending module of a control device is the communication unit of the chip.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of another programmable data processing device to generate a machine, so that instructions executed by a computer or the processing unit of the another programmable data processing device generate an apparatus for implementing a specific function in one or more processes in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

What is claimed is:

1. A channel state information measurement method, comprising:
   receiving, by a terminal device, configuration information from a network device, wherein the configuration information comprises first indication information and second indication information, the first indication information indicates K channel measurement signal resources, K is greater than or equal to 2, the second indication information indicates the terminal device is to measure aggregated channel state information (CSI) based on N channel measurement signal resources, and N is less than or equal to K;
   measuring, by the terminal device, the N channel measurement signal resources based on the configuration information; and
   obtaining, by the terminal device, the aggregated CSI through calculation based on N measurement results, wherein the aggregated CSI is CSI of M antenna ports, and M is a sum of quantities of antenna ports of the N channel measurement signal resources,
wherein
   the configuration information further comprises third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI, and
   the resource used by the terminal device shares an orthogonal frequency division multiplexing (OFDM) symbol with the remaining resource used by the another device.

2. The method according to claim 1, wherein N is less than K, and the second indication information comprises indexes of the N channel measurement signal resources in the K channel measurement signal resources and indication information indicating aggregated CSI measurement.

3. The method according to claim 1, wherein N is equal to K, the second indication information is information for enabling feedback for the aggregated CSI, and the method further comprises:
sending, by the terminal device, the aggregated CSI to the network device based on the second indication information.

4. The method according to claim 1, wherein the obtaining, by the terminal device, the aggregated CSI through calculation based on the N measurement results comprises:
calculating, by the terminal device, the aggregated CSI by using the following information: channels corresponding to N multi-antenna-port resources, a weight coefficient on a receive antenna of the terminal device, a precoder obtained by the terminal device through measurement, an interference covariance matrix, and a noise variance.

5. The method according to claim 1, wherein the obtaining, by the terminal device, the aggregated CSI through calculation based on the N measurement results comprises:
calculating, by the terminal device, the aggregated CSI based on one or more a weight coefficient on a receive antenna of the terminal device, a precoder obtained by the terminal device through measurement, an interference covariance matrix, or a noise variance.

6. A channel state information measurement method, comprising:
generating, by a network device, configuration information, wherein the configuration information comprises first indication information and second indication information, the first indication information indicates K channel measurement signal resources, K is greater than or equal to 2, the second indication information indicates a terminal device is to measure aggregated channel state information (CSI) based on N channel measurement signal resources, and N is less than or equal to K; and
sending, by the network device, the configuration information to the terminal device, wherein
the configuration information further comprises third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI, and
the resource used by the terminal device shares an orthogonal frequency division multiplexing (OFDM) symbol with the remaining resource used by the another device.

7. The method according to claim 6, wherein N is less than K, and the second indication information comprises indexes of the N channel measurement signal resources in the K channel measurement signal resources and indication information indicating aggregated CSI measurement.

8. The method according to claim 6, wherein N is equal to K, the second indication information is information for enabling feedback for the aggregated CSI, and the method further comprises:
receiving, by the network device, the aggregated CSI from the terminal device, wherein the aggregated CSI is CSI of M antenna ports, and M is a sum of quantities of antenna ports of the N channel measurement signal resources.

9. The method according to claim 6, further comprising:
sending, by the network device, fourth indication information to the terminal device, wherein the fourth indication information is used to activate or deactivate aggregated measurement.

10. The method according to claim 6, wherein the second indication information is information for enabling feedback for the aggregated CSI, and the method further comprises:
receiving, by the network device, the aggregated CSI from the terminal device.

11. An apparatus, comprising:
at least one processor, and
a memory coupled to the at least one processor and having program instructions stored thereon which, when executed by the at least one processor, cause the apparatus to:
receive configuration information from a network device, wherein the configuration information comprises first indication information and second indication information, the first indication information indicates K channel measurement signal resources, K is greater than or equal to 2, the second indication information indicates the apparatus is to measure aggregated channel state information (CSI) based on N channel measurement signal resources, and N is less than or equal to K;
measure the N channel measurement signal resources based on the configuration information, and
obtain the aggregated CSI through calculation based on N measurement results, wherein the aggregated CSI is CSI of M antenna ports, and M is a sum of quantities of antenna ports of the N channel measurement signal resources,
wherein
the configuration information further comprises third indication information indicating the apparatus is to measure the aggregated CSI in a plurality of time units, some resources in the plurality of time units are used by the apparatus to measure the aggregated CSI, and a remaining resource in the plurality of time units is used by another device to measure the CSI, and
the resource used by the apparatus shares an orthogonal frequency division multiplexing (OFDM) symbol with the remaining resource used by the another device.

12. The apparatus according to claim 11, wherein N is less than K, and the second indication information comprises indexes of the N channel measurement signal resources in the K channel measurement signal resources and indication information indicating aggregated CSI measurement.

13. The apparatus according to claim 11, wherein N is equal to K, the second indication information is information for enabling feedback for the aggregated CSI, and the program instructions further cause the apparatus to:
send the aggregated CSI to the network device based on the second indication information.

14. The apparatus according to claim 11, wherein the program instructions cause the apparatus to:
calculate the aggregated CSI by using the following information: channels corresponding to N multi-antenna-port resources, a weight coefficient on a receive antenna of the apparatus, a precoder obtained by the apparatus through measurement, an interference covariance matrix, and a noise variance.

15. The apparatus according to claim 11, wherein the program instructions cause the apparatus to:
calculate the aggregated CSI based on one or more of a weight coefficient on a receive antenna of the apparatus, a precoder obtained by the apparatus through measurement, an interference covariance matrix, and a noise variance.

16. An apparatus, comprising:
at least one processor; and
a memory coupled to the at least one processor and having program instructions stored thereon which, when executed by the at least one processor, cause the apparatus to:
generate configuration information, wherein the configuration information comprises first indication information and second indication information, the first indication information indicates K channel measurement signal resources, K is greater than or equal to 2, the second indication information indicates a terminal device is to measure aggregated channel state information (CSI) based on N channel measurement signal resources, and N is less than or equal to K; and
send the configuration information to the terminal device, wherein
the configuration information further comprises third indication information indicating the terminal device is to measure the aggregated CSI in a plurality of time units, some resources in the plurality of time units are used by the terminal device to measure the aggregated CSI, and a remaining resource in the plurality of time units is used by another device to measure the CSI, and the resource used by the terminal device shares an orthogonal frequency division multiplexing (OFDM) symbol with the remaining resource used by the another device.

17. The apparatus according to claim 16, wherein N is less than K, and the second indication information comprises indexes of the N channel measurement signal resources in the K channel measurement signal resources and indication information indicating aggregated CSI measurement.

18. The apparatus according to claim 16, wherein N is equal to K, the second indication information is information for enabling feedback for the aggregated CSI, and the program instructions further cause the apparatus to:
receive the aggregated CSI from the terminal device, wherein the aggregated CSI is CSI of M antenna ports, and M is a sum of quantities of antenna ports of the N channel measurement signal resources.

19. The apparatus according to claim 16, wherein the program instructions further cause the apparatus to:
send fourth indication information to the terminal device, wherein the fourth indication information is used to activate or deactivate aggregated measurement.

20. The apparatus according to claim 16, wherein the second indication information is information for enabling feedback for the aggregated CSI, and the program instructions further cause the apparatus to:
receive the aggregated CSI from the terminal device.

* * * * *